Oct. 6, 1970 M. METZ ET AL 3,532,826
GUIDEWIRE NETWORK WITH GROUP SCANNING
Filed July 19, 1967
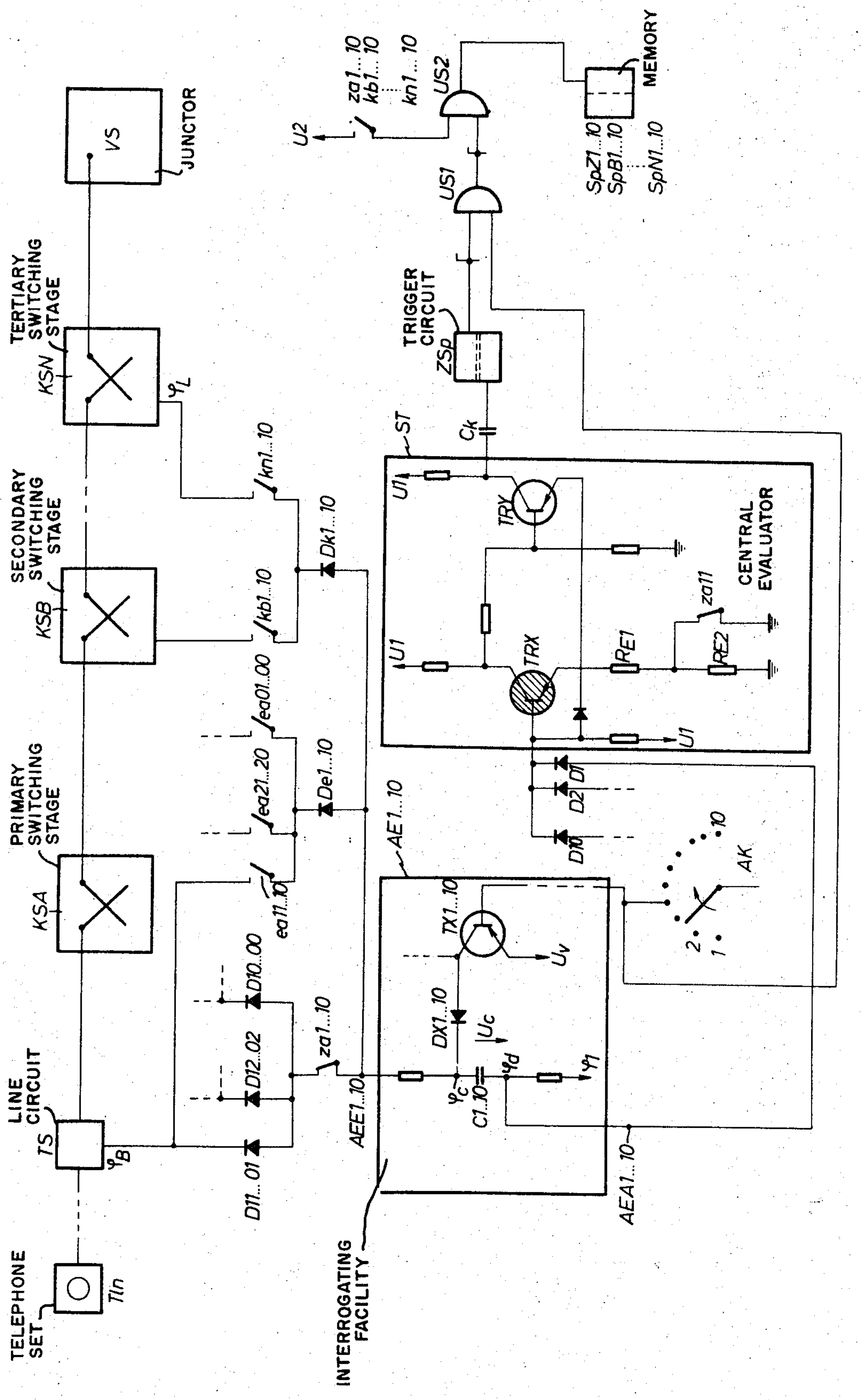

3,532,826

GUIDEWIRE NETWORK WITH GROUP SCANNING

Manfred Metz, Ditzingen, and Dieter Niedergesass, Schwieberdingen, Germany, assignors to International Standard Electric Corporation, New York, N.Y., a corporation of Delaware Filed July 19, 1967, Ser. No. 654,437
Claims priority, application Germany, July 26, 1966, St 25,688
Int. Cl. H04q 3/54
U.S. Cl. 179—18 6 Claims

ABSTRACT OF THE DISCLOSURE

In a switching network with a separate guide wire network and a central scanner, the group of a calling subscriber is determined, whereupon the links of the guidewire network are scanned stage-by-stage, starting at the junctor end. The identity of the subscriber within his previously identified group is determined during a final scanning cycle.

This invention relates to a circuit arrangement for conducting a route search through a guide-wire network which is equipped for giving telecommunication services and more particularly to telephone exchange systems.

In such exchange systems, the first step is to recognize the closing of the subscriber loop circuit which occurs responsive to a lifting of the handset by the calling subscriber. Furthermore, it is necessary to find an originating route leading across several switching stages from the subscriber station to an idle junctor. This route must, of course, take into account the busy and idle conditions which are prevailing in the switching network.

In a telephone exchange system with a multi-stage crosspoint arrangement and a separate guide-wire network, the D.C. condition resulting from the closing of the loop is converted into an offering signal and then forwarded to the guide-wire network. Heretofore, each interstage link in the network included means for recognizing the seizing of a subscriber line and the appearance of an offering signal on the links. Consequently, a considerable expenditure was required to provide the checking means per link in the circuit arrangements known to the prior art.

Accordingly, an object of the invention is to provide a circuit arrangement for conducting a route search in a separate guide-wire network which represents a switching network. A further object is to accomplish this route search without the necessity of providing a separate checking facility for each link section in the network.

According to one aspect of the invention, the problem is solved by a scanning device in which a first scanning cycle identifies the group in which the seizing subscriber line belongs. After having identified the group, the scanning device is connected to interrogate the links of the guide-wire network, step-by-step, from the junctor's end to the calling end. During a final scanning cycle, the scanning device determines the input into the guide wire network for the seizing subscriber line by scanning the individual line circuits of the subscriber group found during the first scanning cycle.

The advantage is clear. Instead of several individual checking devices, it is necessary to provide only one common checking device. Another advantage is that the individual identification of the seizing subscriber is made during the final scanning cycle. Therefore, since the units digit is found during the last scanning stop, time is saved during the establishment of the connection. More specifically, if the unit were marked immediately after the tens digit was found, the same time would be required for interrogation to find the units digit. And, means would have to be provided for storage of the tens digit and for marking available guide wires without the possibility of marking switchpoint of the input stage for interrogation.

The initiation of the link checking, the second, and the further scanning cycles depend upon the results of the group interrogation. The circuit arrangement is provided with a central evaluating element and a storage memory which are connected via first and second AND-circuits to forward the results of the individual scanning cycles to the setting elements for through-switching the connecting path. The storage memory contains the results of the individual scanning cycles, except for the units digits.

According to a further embodiment of the invention, the circuit arrangement may include a buffer storage for holding the result of one scanning cycle. By using a buffer storage in this way, the results are constantly derived and the setting information for the storage units are saved.

To achieve an increased safety in evaluation, an emitter resistance of a central evaluator can be switched to a higher value after the first scanning cycle. This shifts the responding threshold of the evaluator.

The above mentioned and other features of this invention and the manner of obtaining them will become more apparent, and the invention itself will be best understood by reference to the following description of an embodiment of the invention taken in conjunction with the accompanying drawings, in which the single sheet of drawing is a schematic circuit diagram which shows the circuit for seizing a subscriber having a two-digit call number; however, it should be understood that the principle may be expanded to provide for any convenient number of digits.

In the non-operative condition, the subscriber lines are concentrated into groups of ten. Each group is connected with the interrogating facilities AF1 . . . 10 via contacts *za*1 . . . *za*10. The interrogation facilities are individually provided for the respective groups of ten. The inputs AEE1 . . . 10 of the interrogating facilities are connected via the diodes D11 . . . D00, to the *b*-wire in the subscriber line circuit TS. If no scanning cycle has started within a group of ten, the *b*-wires of that group are without current. Thus, the potential $\varphi_B$ is zero volts or ground potential, without considering the direct-axis components of the voltage and leakages. The same applies for potential $\varphi_c$.

The device AK is a cyclic chain of selecting relays. This chain steps to sequentially render the pertinent transistor TX1 . . . 10 of the interrogating facilities AE1 . . . 10 conductive. The potential $\varphi_c$ at the capacitor C1 . . . 10 does not change because the emitter of the transistor is connected to a potential which is negative. That is, the voltage $U_v$ is smaller than the potential zero and the diode TX1 . . . 10 remains blocked.

If a subscriber station goes off hook, its hookswitch contacts close, and a loop is completed within a group of ten lines. Then, the potential $\varphi_B$ of the subscriber line charges and consequently the potential $\varphi_c$ becomes more negative than the potential of the emitter of the transistor which is marked with the voltage $U_v$. If the transistor TX1 . . . 10 is now rendered conductive during a scanning cycle, the corresponding one of the diodes DX1 . . . 10 become conductive and the potential $\varphi_c$ at the capacitor C1 . . . 10 changes by $\Delta\varphi_c = \varphi_c - U_v$. This change in voltage reaches and triggers a Schmitt-trigger circuit in the central evaluator ST, via the OR-circuit formed by the diodes D1 . . . 10. The result is that the Schmitt-trigger output is forwarded to a bistable trigger circiut ZS*p* via a coupling capacitor $C_k$. Intermediately, this signal is stored in said trigger circuit. When the trigger circuit responds the selecting chain AK is stopped in any suitable manner (not shown) on the drawing. The position of the selecting chain marking the interrogated group of ten subscriber circuits and the intermediately stored information indicating the condition of the interrogated group is stored by the condition of the flip-flop circuit SPZ1 . . . 10. The coincidence resulting therefrom is associated with the respective group of ten subscriber lines by the output of the two AND-circiuts US1 and US2.

The contacts *za*1 . . . 10 are opened at the same time, whereupon the contacts *kn*1 . . . 10 are closed. These contacts are assoicated with the switching stage N (KSN). Thus, the inputs AEE1 . . . 10 of the interrogating facilities AE1 . . . 10 are connected with the links of the guide wire network of said switching stage.

The offering signal is a potential $\varphi_L$ on one guide wire. This signal is equal to the starting voltage $\varphi_B$ at the input to the network where the first interrogation found a calling condition in a group of ten wires. With regard to the voltage $\varphi_B$, the deviations from the nominal value should be viewed as being due to different line lengths, direct-axis component of the voltage, etc. If the selecting chain scans the capacitors C1 . . . 10, the central evaluator ST responds at an available link which is carrying the offering signal. The selecting chain AK is stopped, and the link which has been found is marked by setting the storage device S*p*N1 . . . 10 which is associated with the link. In the following stages KSN–1 . . . KSB, the links are found and marked in the same way.

A buffer storage circuit may also be used. This circuit consists of only two storage units, whereby the information is alternately entered in one storage while the result of the preceding interrogation is read out of the other storage to mark the respective crosspoint.

The inputs of the switching stage A (KSA) are identical with the subscriber lines. The contacts *ea*11 . . . 00 are closed only during the unit interrogation of the subscribers lines within the previously marked group of ten.

After the interrogation of the tens digit, another contact *za*11 is opened, simultaneously with the contacts *za*1 . . . 10. The emitter resistance of the transistor TRX of the Schmitt-trigger is thus increased. This shifts the trigger responding threshold. This measure is provided because it is possible that seizing has just been recognized responsive to an interrogation of the tens digit. But, the evaluating device does not respond anymore during the later units interrogation, due to the tolerances of the elements of the evaluating facility. By increasing the emitter resistance, a response of the central evaluator is secured.

While the principles of the invention have been described above in connection with specific apparatus and applications, it is to be understood that this description is made only by way of example and not as a limitation on the scope of the invention.

We claim:

1. A guide wire network search circuit comprising a multistage switching network, a plurality of subscriber lines connected to one side of said network, said lines being arranged in groups, means for scanning said groups to find a group containing a calling line, a plurality of junctors connected to the other side of said network, means responsive to the finding of a group containing a calling line for selecting an idle junctor, and means for successively interrogating each stage in said network from said junctor to said calling line in search of an idle path through said network.

2. The circuit of claim 1 and means for scanning the lines in said group as a last step in said search to find the calling line in said group, the called line scan furnishing the units digit of the called number.

3. The circuit of claim 1 and a plurality of evaluating means individually operative during the scanning of each stage, scanning means for individually enabling each of said elevating means, means responsive to said scanning means for connecting the respective inputs of said evaluating means to the subscriber lines, and means responsive to a coincidence of an output from said scanning means and an output of said evaluating means for connecting one of said evaluating means having said output to a central evaluating facility.

4. The circuit of claim 3 wherein said central evaluating facility comprises a memory storage means operated responsive to said coincidence of said outputs, said storage means being set responsive to each success scan of said guide wire network.

5. The circuit of claim 4 wherein said storage means comprises a pair of buffer stores, and means whereby one buffer stores during one scan while the other reads out, the store read out cycle reversing for each buffer store responsive to each successive scan.

6. The circuit of claim 3 and means wherein said central facility tests for busy/idle conditions on said line, said test being made at a given threshold, and means for thereafter changing the threshold of said central facility responsive to a given scan to test for double seizure.

References Cited

UNITED STATES PATENTS 3,347,995 10/1967 Schluter et al.
3,349,189 10/1967 Van Bosse.

KATHLEEN H. CLAFFY, Primary Examiner

W. A. HELVESTINE, Assistant Examiner